US011777752B2

(12) United States Patent
Eghbal

(10) Patent No.: US 11,777,752 B2
(45) Date of Patent: Oct. 3, 2023

(54) POWER OVER ETHERNET DEVICE TESTER AND CONFIGURATION SYSTEM, APPARATUS, AND METHOD

(71) Applicant: Ali Eghbal, San Diego, CA (US)

(72) Inventor: Ali Eghbal, San Diego, CA (US)

( * ) Notice: Subject to any disclaimer, the term of this patent is extended or adjusted under 35 U.S.C. 154(b) by 0 days.

(21) Appl. No.: 17/200,871

(22) Filed: Mar. 14, 2021

(65) Prior Publication Data

US 2021/0203516 A1 Jul. 1, 2021

Related U.S. Application Data

(63) Continuation-in-part of application No. 13/236,634, filed on Sep. 19, 2011, now abandoned.

(51) Int. Cl.
*G06F 1/00* (2006.01)
*H04L 12/10* (2006.01)

(52) U.S. Cl.
CPC .................................. *H04L 12/10* (2013.01)

(58) Field of Classification Search
CPC ....... H04L 12/10; H04L 25/0264; G06F 1/26; G06F 1/266; Y02B 60/44
See application file for complete search history.

(56) References Cited

U.S. PATENT DOCUMENTS

| | | | | |
|---|---|---|---|---|
| 7,921,308 B2* | 4/2011 | Dhuyvetter | ............. | H04L 12/10 713/300 |
| 8,013,466 B1* | 9/2011 | Thompson | ................ | H02J 1/00 713/300 |
| 8,082,453 B2* | 12/2011 | Diab | ....................... | G06F 1/266 307/29 |
| 2007/0223520 A1* | 9/2007 | Diab | ....................... | H04L 41/00 370/463 |
| 2009/0055662 A1* | 2/2009 | Diab | ......................... | G06F 1/26 713/300 |
| 2010/0042855 A1* | 2/2010 | Karam | ...................... | G06F 1/26 713/300 |

\* cited by examiner

*Primary Examiner* — Zhipeng Wang
(74) *Attorney, Agent, or Firm* — Merle W Richman

(57) ABSTRACT

A system, topology, and methods for testing a POE signal downstream from a POE source and configuring a POE device remotely including wired and wireless system for providing signals from remote POE device while providing power to the POE device.

20 Claims, 11 Drawing Sheets

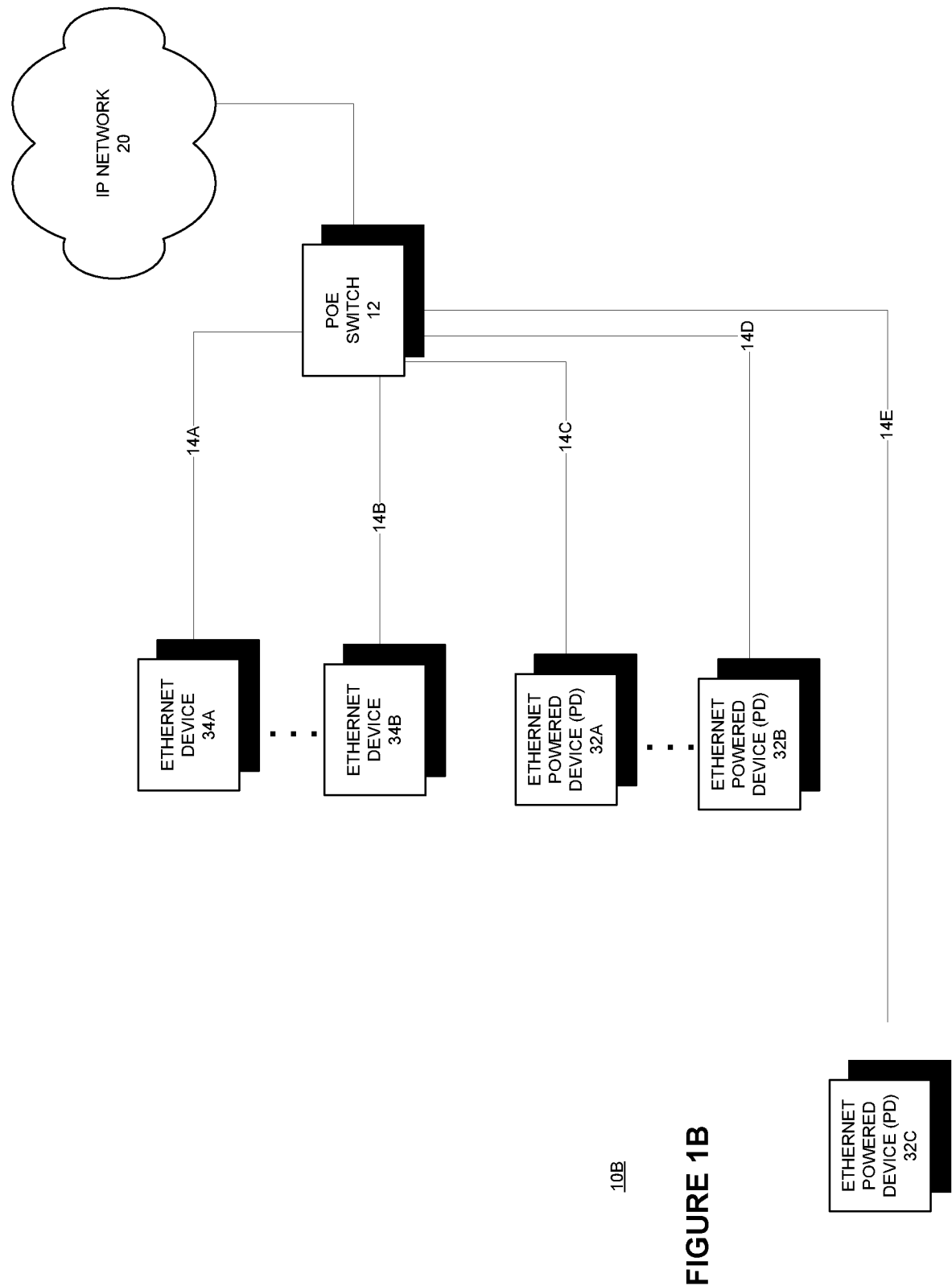

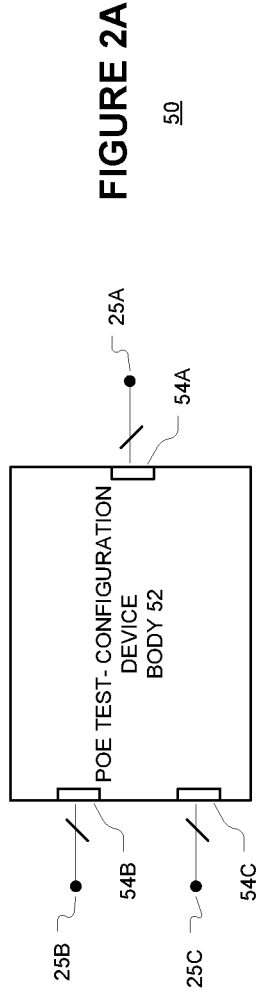
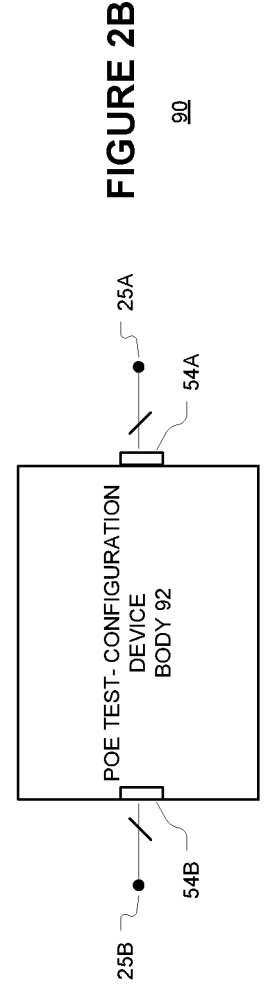

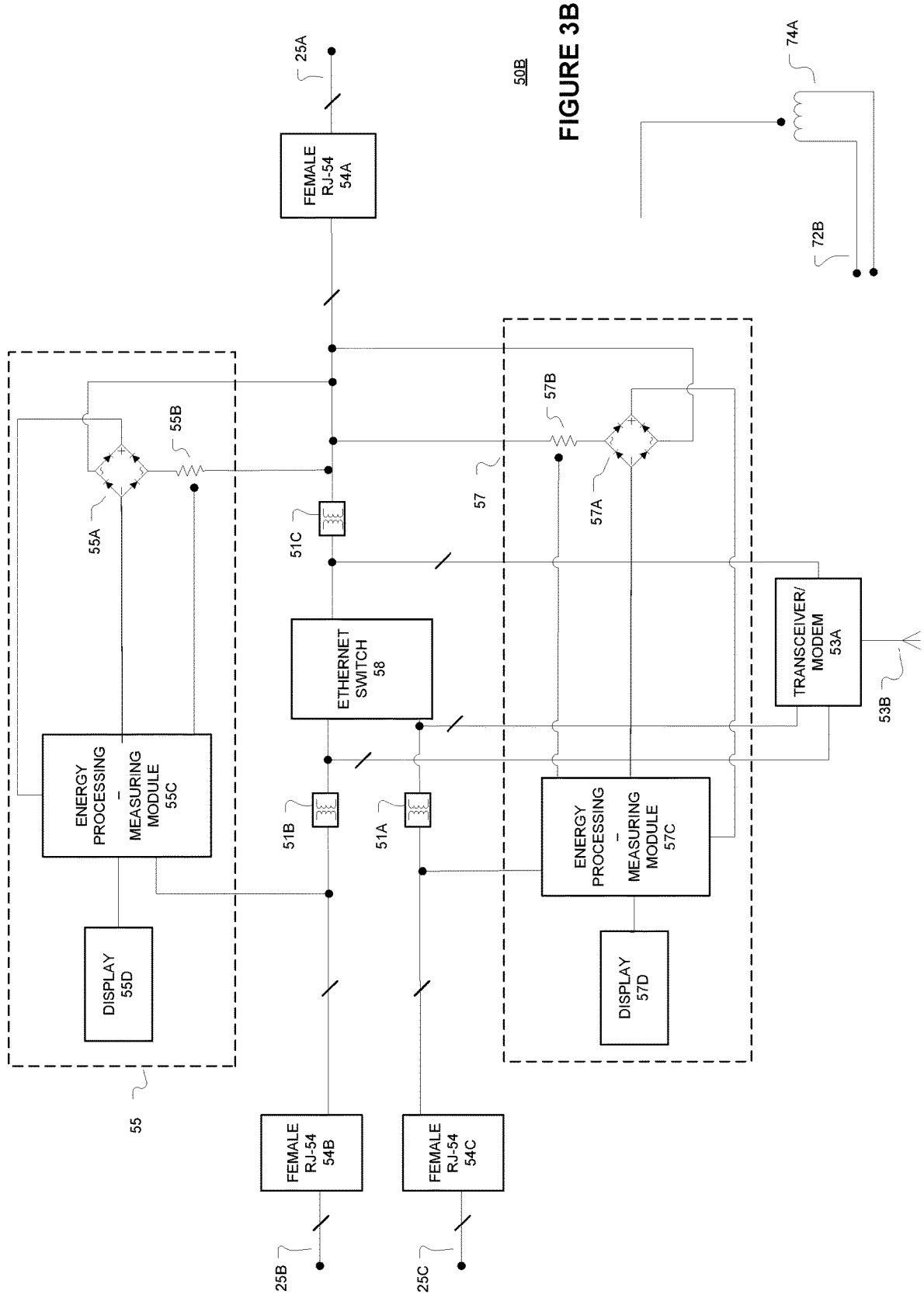

POWER OVER ETHERNET DEVICE TESTER AND CONFIGURATION SYSTEM, APPARATUS, AND METHOD

TECHNICAL FIELD

Various embodiments described herein relate to systems and methods for testing, adding, and configuring a new POE device to a POE network.

BACKGROUND INFORMATION

It may be desirable to test a POE signal downstream from a POE source prior to coupling to a new POE device and configuring the POE device remotely while providing power to the POE device.

BRIEF DESCRIPTION OF THE DRAWINGS

FIG. 1B is a simplified diagram Power Over Ethernet ("POE") architecture shown in FIG. 1A with a POE device being added according to various embodiments.

FIG. 2A is a simplified diagram of a POE testing and configuration device (POE-TCD) according to various embodiments.

FIG. 2B is a simplified diagram of another POE testing and configuration device (POE-TCD) according to various embodiments.

FIG. 3B is a block diagram of a POE testing and configuration device (POE-TCD) according to various embodiments.

DETAILED DESCRIPTION

Figure 1A:
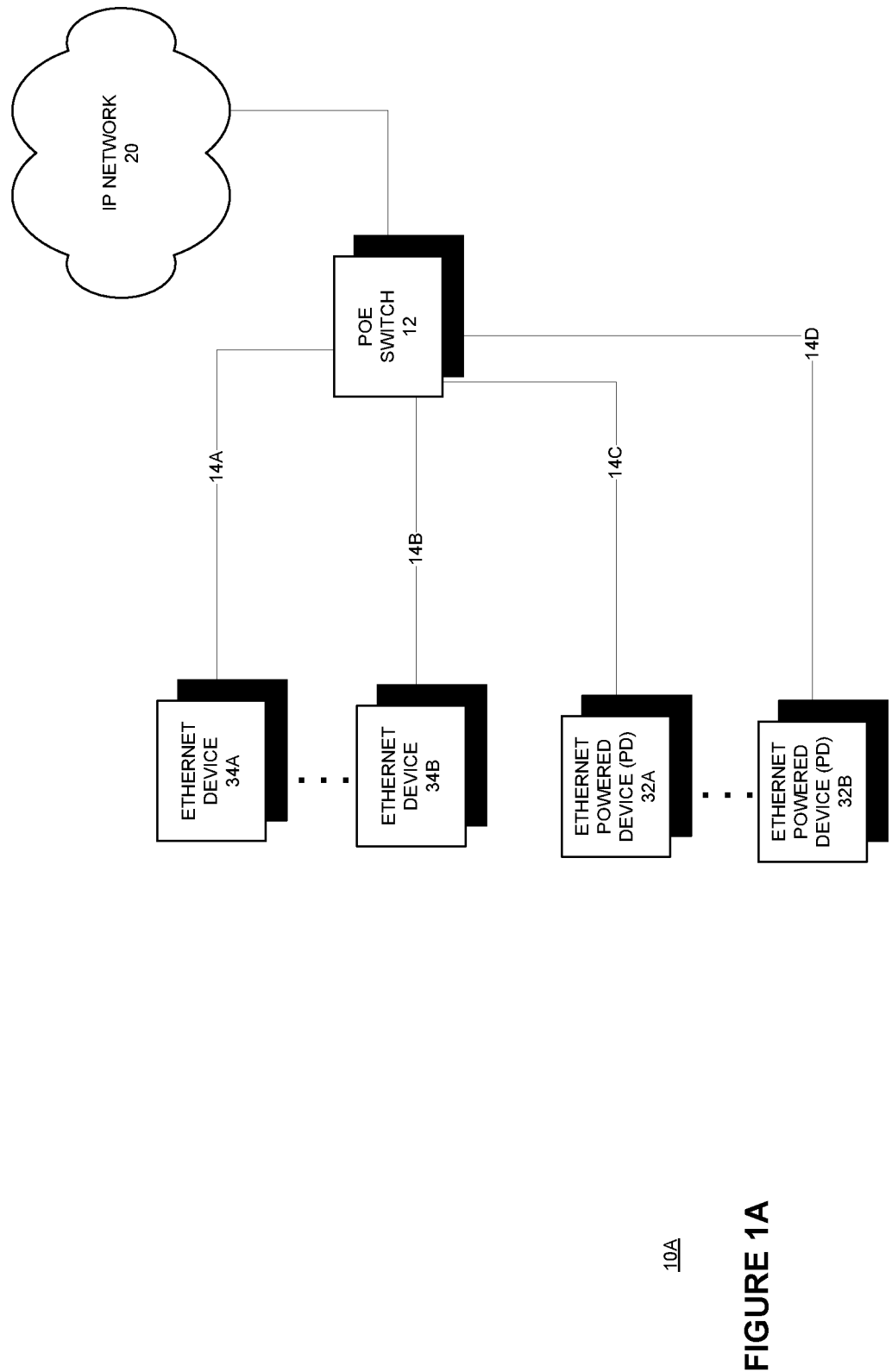
FIG. 1A is a simplified diagram of Power Over Ethernet ("POE") architecture according to various embodiments.

FIG. 1A is a simplified diagram of POE architecture 10A according to various embodiments. As shown in FIG. 1A, architecture 10A may include an internet protocol (IP) network 20 and a POE router or switch (switch) 12 coupled to a plurality of Ethernet devices 34A-B at various locations via wires 14A-B and a plurality POE devices (PD) 32A-B at various locations via wires 14C-D. In an embodiment, an internet switch with a separate POE power source may be employed. The IP network 20 may communicate data using an internet protocol with devices coupled to the network 20. The IP network 20 may be a network of networks including the global Internet. The POE switch 12 may enable communication between devices 32A-B, 34A-B and the IP network 20 and with each other at various locations via cables 14A-D. The POE switch 12 may also provide power to one or more devices 32A-B at various locations via cables 14C-D. The cables 14A-D may be standardized Ethernet cables, commonly including 4 pairs of wires. Standardized Ethernet cables may have a rating based on the Institute of Electrical and Electronics Engineers (IEEE) standards such as a category 3, 5, 5e, 6, and 6a cables (wires). Standard or common Ethernet cabling may enable data to be communicated differentially over four pairs, in particular wires 1-2, 3-6, 4-5, and 7-8.

Devices 34A-B and 32A-B commonly require power to operate. In order to reduce infrastructure and wiring costs operational power may also be provided over a standard ethernet cable, termed power over ethernet (POE). Devices 32A-B receiving power over ethernet (POE) may be termed a powered device (PD). Power over Ethernet (PoE) may be provided via standard Ethernet cabling according to one or more IEEE standards including 802.3af (PoE standard), 802.3at (PoE+ or PoE plus), IEEE 802.3bu, and IEEE 802.3bt (4PPoE). The 802.3af standard may enable the transmission of power up to 15.4 W (minimum 44V DC and 350 mA). The 802.3at standard may enable the transmission of power up to 25.5 W. The IEEE 802.3bu standard may enable the transmission of power up to 50 W (at PD). The IEEE 802.3bt standard may enable the transmission of power up to 55 W (Type 3) and up to 90-100 W (Type 4).

In an embodiment, a POE switch 12 may provide power and data to PD 32A-B. The power may be sufficient to enable Ethernet PD 32A-B to operate without access to another power source. A PD 32A, 32B may include IP telephones, wireless LAN access points, cameras with pan tilt and zoom (PTZ), remote Ethernet switches, embedded computers, thin clients and LCDs. In an embodiment, POE source equipment (PSE) may also be co-located in a switch, router, or other network communication device 12. In an embodiment, a POE switch 12 may provide power to PD 32A-B and may not communicate data or be coupled to an IP network 20. A PD 32A-B may be compliant with one or more standards 802.3af (PoE standard), 802.3at (PoE+ or PoE plus), IEEE 802.3bu, and IEEE 802.3bt (4PPoE). A POE switch 12 may provide different power levels to a PD 32A-B according to a standard. For example, a POE switch 12 may sense that a coupled device 32A-B is a POE device (PD) and is complaint with a particular standard. Then the POE switch 12 may provide different levels of energy (power) to a PD 32A-B via various wires of an Ethernet cable 14C-D.

Architecture 10A may initially only include a POE switch 12. Then an ethernet device 34A-B or PD 32A-B may be added individually or in groups. For example, a new PD 32C may be added to architecture 10A becoming architecture 10B as shown in FIG. 1B. A cable 14E may be run from the POE switch 12 (directly or indirectly via other network devices) to the PD 32C. It is noted that a PD 32C may be placed in a location that does not have wireless or cellular signals. Further, a PD 32C may be a wired only device and not capable of communicating other than via packets over one or more wire pairs of a cable 14E. Further, the PD 32C may placed at a great distance from the POE switch 12 (up to 100 meters depending on the cable 14E and power to be provided to a PD 32C in an embodiment). A PD 32C may also not be able to note the power levels it receives via cable 14E. For example, a PD 32C may be a camera that needs to be aligned to take desired image(s) or video of an environment about the PD 32C. A PD 32C may also be sensitive to power levels and expensive. A User may need to verify power levels provided by a cable 14E are stable and meet the requirements of the PD 32C.

Figure 1C:
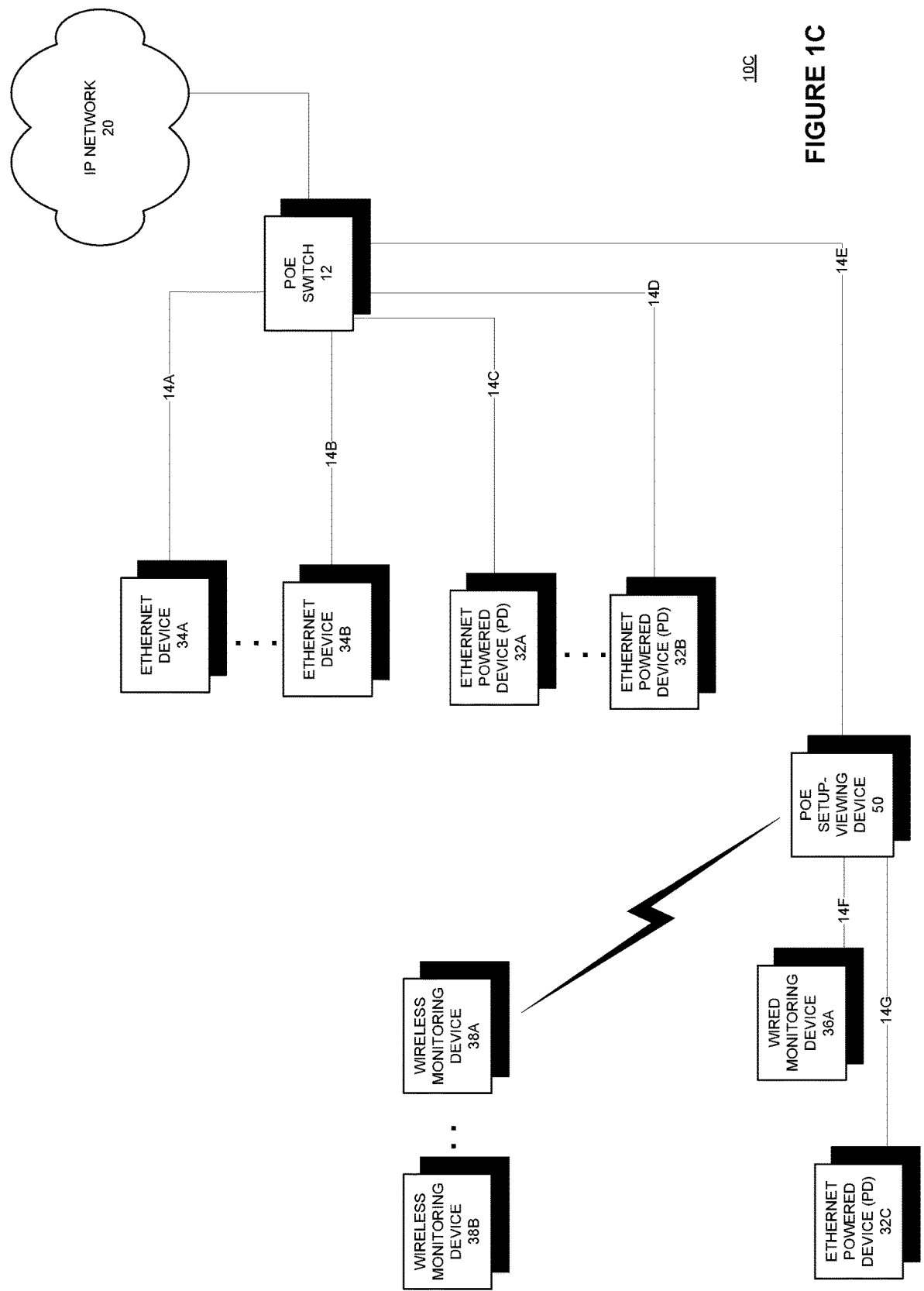
FIG. 1C is a simplified diagram Power Over Ethernet ("POE") architecture shown in FIG. 1A with a POE testing and configuration device coupled to a new POE device according to various embodiments.

FIG. 1C is a simplified diagram Power Over Ethernet ("POE") architecture shown in FIG. 1A with a POE testing and configuration device 50 coupled to a POE device 32C according to various embodiments. As shown in FIG. 1C, architecture 10C further includes a POE testing and configuration device (POE-TCD) 50, PD 32C, cables 14F and 14G, wired monitoring device 36A, and wireless monitoring devices 38A-B. In an embodiment, the algorithm to install or employ a new PD 32C in an architecture 10C may include coupling the POE-TCD 50 upstream port 54A (FIG. 2) to receive signals 25A including data and power from a POE switch 12. The POE-TCD 50 may then measure or be directed to measure the energy (range, highest, lowest) or power available from the POE switch 12 via cable 14E and display one or more energy characteristics on a display 55D, 57D. The energy characteristics may include current, lowest, and highest available voltage, current, wattage, and other measurable characteristics.

Figure 3A:
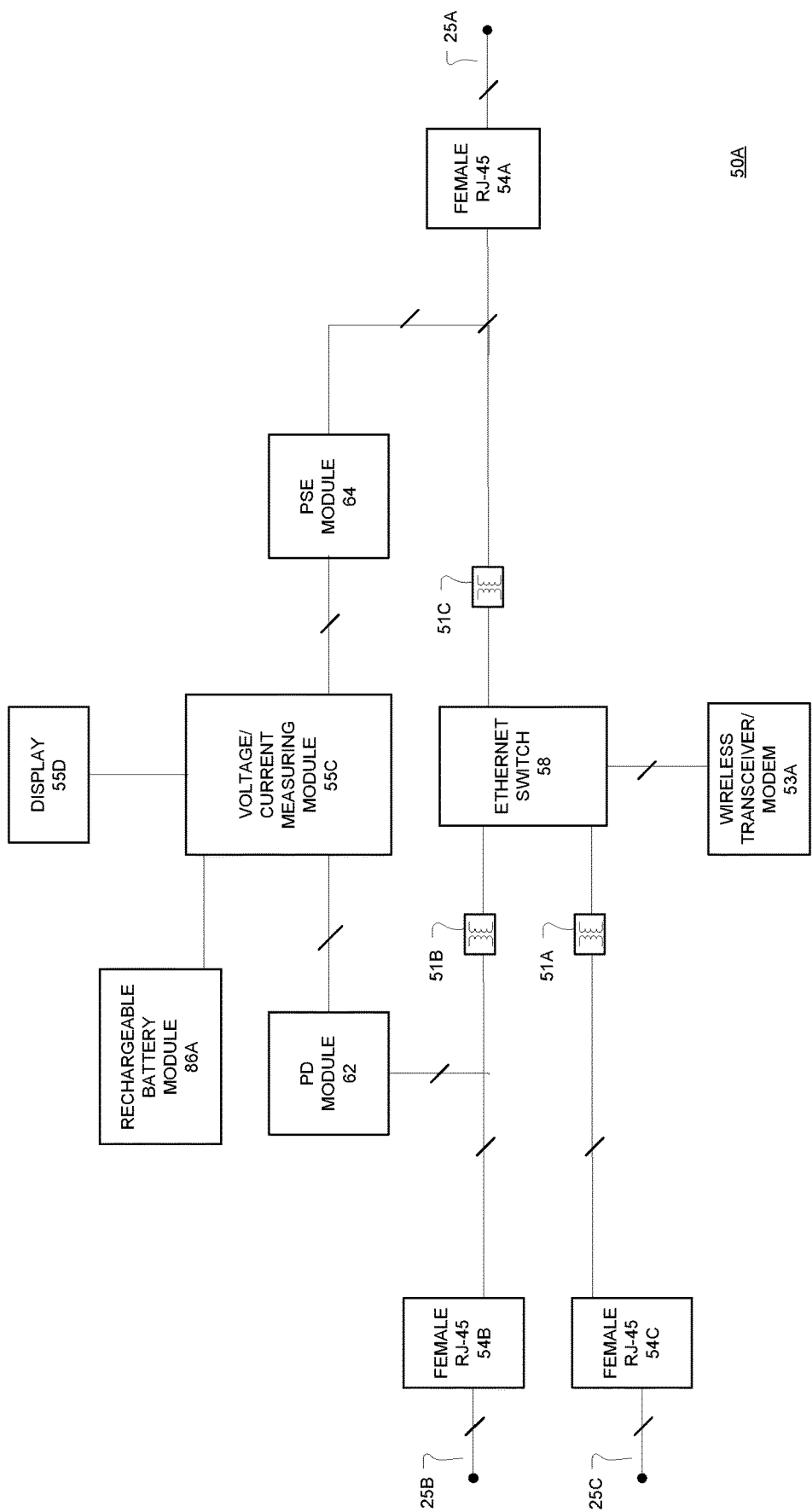
FIG. 3A is a block diagram of a POE testing and configuration device (POE-TCD) according to various embodiments.

A PD 32C to be added or configured may be coupled to a downstream port 54B, MC of a POE-TCD 50, 50A-D (FIGS. 2, 3A, 3B, 4A, and 4B). In an embodiment, a downstream port 54B or 54C may be dedicated to a PD 32C to be configured or may be selectable via switch 58 of the POE-TCD 50B (FIG. 3B). A User may couple a PD 32C to a port 54B, 54C based on the energy testing or may not conduct energy testing prior to the coupling of a PD 32C to be configured to a port 54B, 54C. A POE-TCD 50A-D may sense the power requirements of a PD 32C via a POE processing module 55, 57, PD module 62 and provide power to a PD 32C via its ports 54B, 54C. A POE-TCD 50A-D POE processing module 55, 57, PSE module 64 may receive energy or power from a POE switch 12 via its upstream port 54A.

In an embodiment, a wired monitoring device (MD) 36A may be coupled to the other of the ports 54B, 54C of a POE-TCD 50A-D. A POE-TCD 50A-D via a switch 58 may forward data signals 25B or 25C from a coupled PD 32C (to be configured) to the wired MD 36A. In an embodiment, a wired MD 36A may be PD. A POE-TCD 50A-D may also sense the power requirements of a MD 36A via the other of the POE processing modules 55, 57, PD module 62 and provide power to the MD 36A via the other of its ports 54B, 54C. A POE-TCD 50A-D may provide data received from a coupled PD 32C to the MD 36A, enabling the MD 36A to see the output of the PD 32C such an image or video of camera and then enable a User to adjust the PD 32C (such as a camera) manually. A POE-TCD 50A-D may also enable two-way communication between a PD 32C and a MD 36A, enabling a MD 36A to communicate and control the operation of a PD 32C in an embodiment. A MD 36A, for example may log into a PD 32C to view its data and control its operation in an embodiment.

In an embodiment, one or more wireless monitoring devices (MD) 38A-B may be wirelessly coupled to a POE-TCD 50A-D. A POE-TCD 50A-D via a switch 58 and a transceiver/modem (TCM) 53A may forward data signals 25B or 25C from a coupled PD 32C (to be configured) to a wireless MD 38A-B. A POE-TCD 50A-D may provide data received from a coupled PD 32C to a MD 38A-B, enabling a MD 38A-B to see the output of the PD 32C such an image or video of camera and then enable a User to adjust the PD 32C (such as a camera) manually. A POE-TCD 50A-D may also enable two-way communication between a PD 32C and a MD 36A, enabling a MD 36A to communicate and control the operation of a PD 32C in an embodiment. A MD 36A, for example may log into a PD 32C to view its data and control its operation in an embodiment. In an embodiment, a POE-TCD 50A-D TCM 53A may include a server that enables communications with multiple MD 36A, 38A-B via various wired and wireless protocols including Wi-Fi.

Figure 1D:
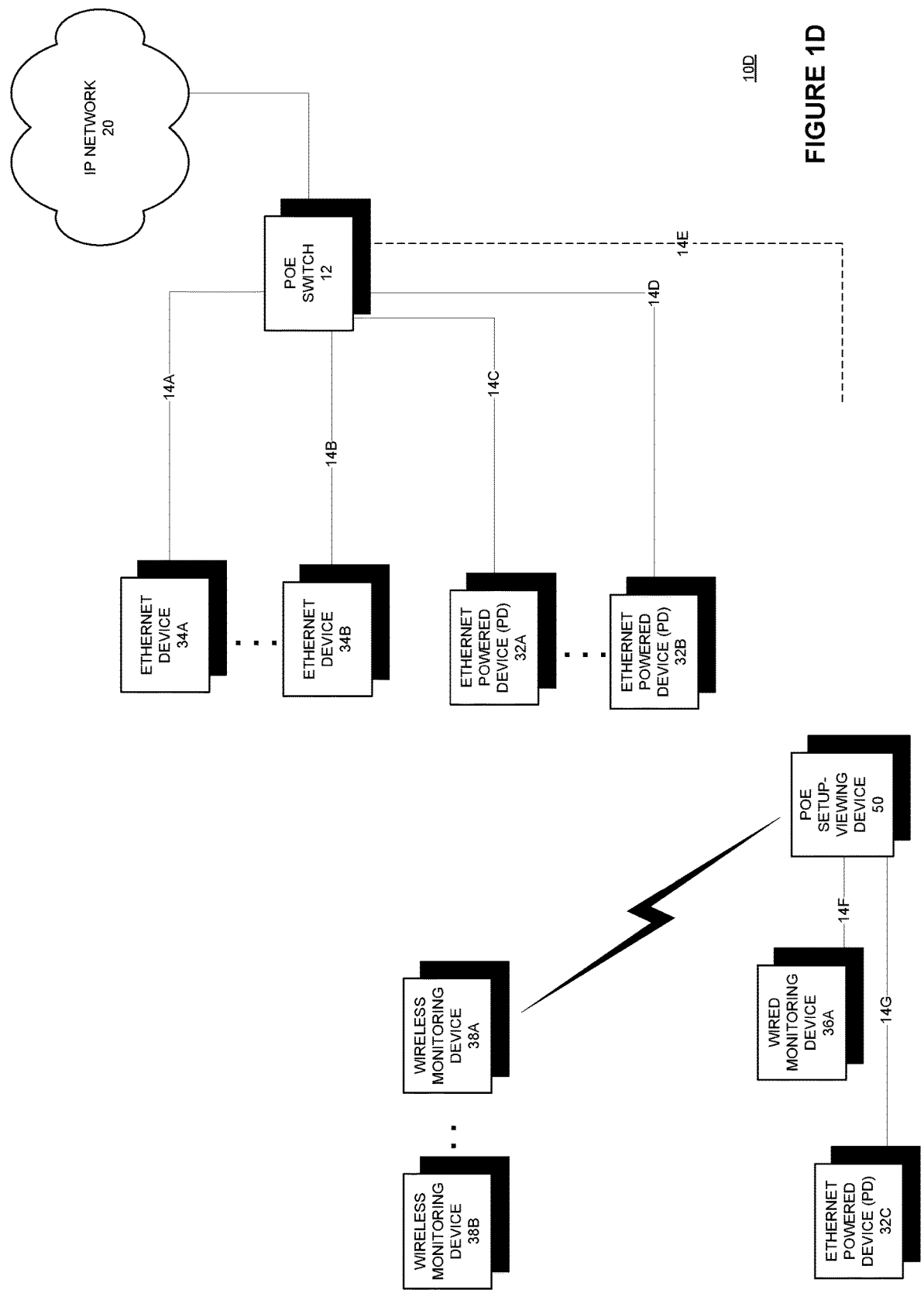
FIG. 1D is another simplified diagram Power Over Ethernet ("POE") architecture shown in FIG. 1A with a POE testing and configuration device coupled to a new POE device according to various embodiments.

In an embodiment as shown in FIG. 1D, during the installation or employment a new PD 32C in an architecture 10D it may not be possible to couple the POE-TCD 50 upstream port 54A (FIG. 2) to receive signals 25A including data and power from a POE switch 12. For example, the POE switch 12 may not be provisioned, powered, or installed yet. In addition, the wiring 14E to couple the POE switch 12 to a POE-TCD 50 may not yet be provisioned or installed. In such an embodiment, the POE-TCD 50 may include an internal power source (86A) sufficient to provide power to a PD 32C to be installed in architecture 10D.

FIG. 2A is a simplified diagram of the physical structure of a POE-TCD 50 according to various embodiments. As shown in FIG. 2, a POE-TCD 50 may include receiving port 54A in or on its body 52 that is couplable to a standard ethernet cable 14A-E. The port 54A may be a female or male RJ-45 jack in an embodiment, and a female RJ-45 jack in an embodiment. The POE-TCD 50 may also include a plurality of downstream ports 54B-C in or on its body 52 each that are couplable to a standard ethernet cable 14F-G. The plurality of ports 54B-C may each have a female or male RJ-45 jack in an embodiment, and a female RJ-45 jack in an embodiment.

FIG. 2B is a simplified diagram of the physical structure of another POE-TCD 90 according to various embodiments. As shown in FIG. 2B, a POE-TCD 90 is similar to POE-TCD 50 but may only include a single downstream port 54B in or on its body 52 that is couplable to a standard ethernet cable 14G. The POE-TCD 90 may only communicate with monitoring devices 36A, 38A-B wirelessly. In a further embodiment, the POE-TCD 90 may also not include a receiving port 54A in or on its body 92. In such an embodiment, the POE-TCD 90 may include an internal power source (86A) sufficient to provide power to a PD 32C to be installed such as in architecture 10D.

FIGS. 3A and 3B are block diagrams of POE-TCD 50A-B according to various embodiments. As shown in FIG. 3A, a POE-TCD 50A may include two downstream RJ45 female connectors 54B, 54C, an upstream RJ45 female connector 54A, a PD interface module 62, a PSE interface module 64, a rechargeable battery module 86A, an Ethernet switch 58, several groups of signal transformers 51A-C, a transceiver/modem 53A, a voltage-current measuring module 55C, and a display 55D. The PSE module 64 may include one or more power coupling devices such diode bridges to receive power on one or more wire pairs from the RJ-54 jack 54A. The PD module 62 may include power coupling devices to provide energy to the wires coupled to the RJ-45 jack MB. The PD module 62 may also include power sensing circuitry to sense or poll the power requirements of a coupled device (PD) to the jack 54B. The voltage-current measuring module 55C may determine various characteristics of the power processed by the PSE module 64 including voltage, current, wattage over periods of time and display such characteristics on the display 55D.

Figure 5:
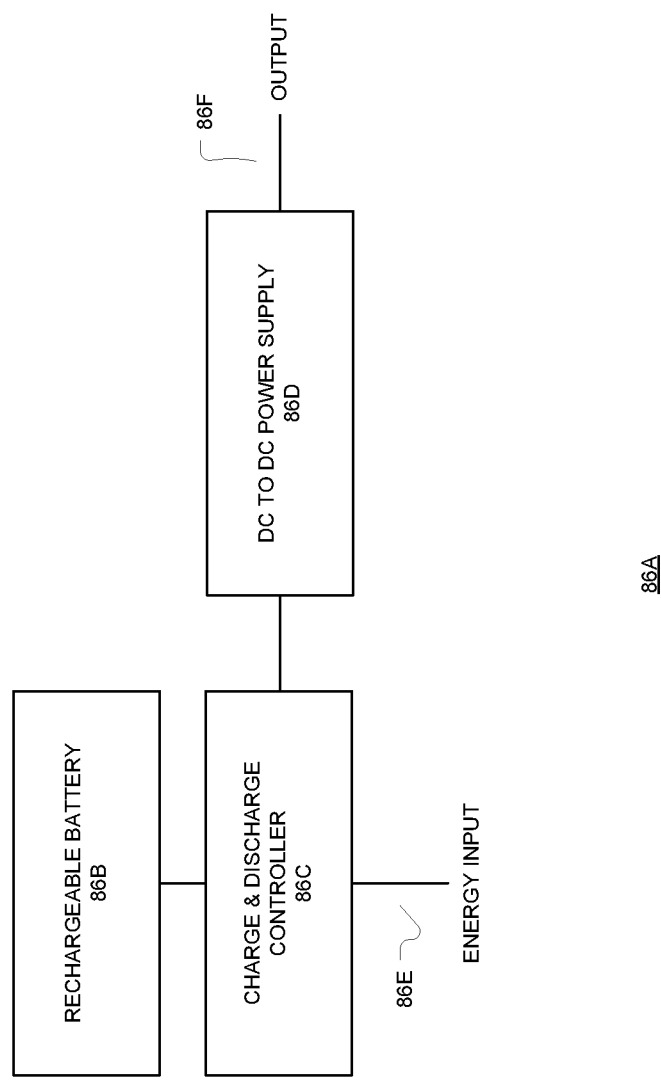
FIG. 5 is a block diagram of a rechargeable battery module according to various embodiments.

In an embodiment, the rechargeable battery module 86A may provide power or additional power to a POE-TCD 50A-D to enable communication and testing of architecture 10C or elements of the architecture 10C regardless of the energy provided (if any) by a POE source 12. FIG. 5 is a block diagram of a rechargeable battery module 86A according to various embodiments. As shown in FIG. 5, the rechargeable battery module 86A may include a rechargeable battery 86D, charging controller 86C, and DC to DC power supply 86D. The controller 86C may receive energy from an input 86E (including from a POE source 12) and charge a rechargeable battery 86B (or any device capable of storing and discharging energy). The controller 86C may also direct energy from the battery 86B to a power supply 86D. The power supply 86D may provide DC (direct current) energy to an output 86F based on the needs of a POE-TCD 50A-D in an embodiment.

As shown in FIG. 3B, a POE-TCD 50B may include two downstream RJ45 female connectors 54B, 54C, an upstream RJ45 female connector 54A, a first POE processing module 55, and a second POE processing module 57, an Ethernet switch 58, a transformer 74A and power source wire pair 72B, several groups of signal transformers 51A-C, a transceiver/modem 53A, and an antenna 53B. Each POE processing module 55, 57 may include one or more diode bridges 55A, 57A, resistors 55B, 57B, an energy processing—measuring module 55C, 57C, and a display module 55D, 57D.

In an embodiment, each downstream RJ45 connector 54A, 54B may be configured to be coupled to a device that may receive POE and communicate IP data such as a new PD 32C or monitoring device 36A. In an embodiment, a specific port may be dedicated as a monitoring device port and the other the PD port. In an embodiment, a User may be able to configure the ports to function as either a monitoring port or PD port. The upstream RJ45 connector 54A may be configured to be coupled to a POE switch 12 or similar device in an embodiment. It is noted that the RJ45 jacks 54A-C may be embedded in the POE-TCD 50A or physically coupled to the POE-TCD 50A-D by wire in a pigtail configuration.

The transformer 74A may be coupled to an external power source wire pair 72B. The transformer 74A may provide power to the Ethernet switch 58 and other elements via the external power wire pair 72B. In each POE processing module 55, 57, the diode bridge 55A, 57A may be coupled to a data differential pair via a resistor 55B, 57B. A diode bridge 55A, 57A may couple the data differential pair to the energy processing—measuring module 55C, 57C. An energy processing—measuring module 55C, 57C may measure the current and voltage of the differential wire pairs via the resistors 55B, 57B and diode bridges 55A, 57A. In an embodiment, the energy processing—measuring module 55C, 57C may determine the maximum energy or power available from a POE switch 12 or other device and provide an indication of its level on display 55D, 57D.

An energy processing—measuring module 55C, 57C may determine the energy requirements of a PD 32C to be configured once coupled to a downstream jack 54B, 54C and provide energy to the downstream jack 54B, 54C via the resistors 55B, 57B and diode bridge 55A, 57A. In an embodiment, when the wired monitoring device 36A is POE device, another of the energy processing—measuring module 55C, 57C may determine the energy requirements of a wired monitoring device 36A once coupled to the other of the downstream jack 54B, 54C and provide energy to the downstream jack 54B, 54C via the resistors 55B, 57B and diode bridge 55A, 57A. A display module 55D, 57D coupled to the energy processing—measuring module 55C, 57C may show the determined current level and voltage level, alternately or simultaneously or other indications of status (signal present) for each device coupled to a downstream port 54B, 54C that receives energy.

For POE-TCD 50A-D, data received from an upstream port 54A may be processed by the switch 58 and forwarded to a downstream port 54B, 54C via various protocols including internet protocols in an embodiment, enabling another User to remotely control or communicate with a device 32C, 36A coupled to a downstream port 54B, 54C. As shown in FIGS. 3A and 3B, a plurality of signal transformers 51A-C may be placed between the switch 58 and signals 25A-C. The signal transformers 51A-C may remove any POE energy and only forward data signals to and from the switch 58. In an embodiment, the signal transformers 51A-C may be embedded in the switch 58. Data received from a downstream port 54B, 54C may be also processed by the switch 58 and forwarded to the upstream port 54A or other downstream port 54B, 54C via various protocols including internet protocols as appropriate. In an embodiment, the Ethernet switch 58 may communicate data between downstream ports 54B, 54C enabling a User of a monitoring device 36A to communicate with a PD 32C. A User may be able to receive data, log into, and communicate with a PD 32C.

In an embodiment, the Ethernet switch 58 may communicate data a downstream ports 54B, 54C coupled to a PD 32C and a wireless device 38A-B. The Ethernet switch 58 may communicate data with a wireless device 38A-B via the transceiver-modem 53A according to various protocols. A User of a wireless monitoring device 38A-B may be able to communicate with a PD 32C via a POE-TCD 50A-D. A User may be able to receive data, log into, and communicate with a PD 32C via a wireless monitoring device 38A-B in an embodiment. In an embodiment, ethernet switch 58, the TCM 53A, or combination thereof may function as a server, enabling wireless monitoring devices 38A-B to link to ae POE-TCD 50A-D using various wireless protocols including Bluetooth, WiMAX, Mesh, Wi-Fi, cellular, and others. For example, a POE-TCD 50A-D may broadcast a service set identifier (SSID) where a wireless monitoring device 38A-B may be able to register and receive an IP address via a login via various Wi-Fi protocols. The ethernet switch 58 may modulate received signals or packets on ports 54A-C based on internet protocol or other local protocols of a network 20 including Transmission Control Protocol (TCP) and the Internet Protocol (IP) Link, Internet, or Transport layers according to various protocols including Internet Protocol version 4 and 6.

Figure 4A:
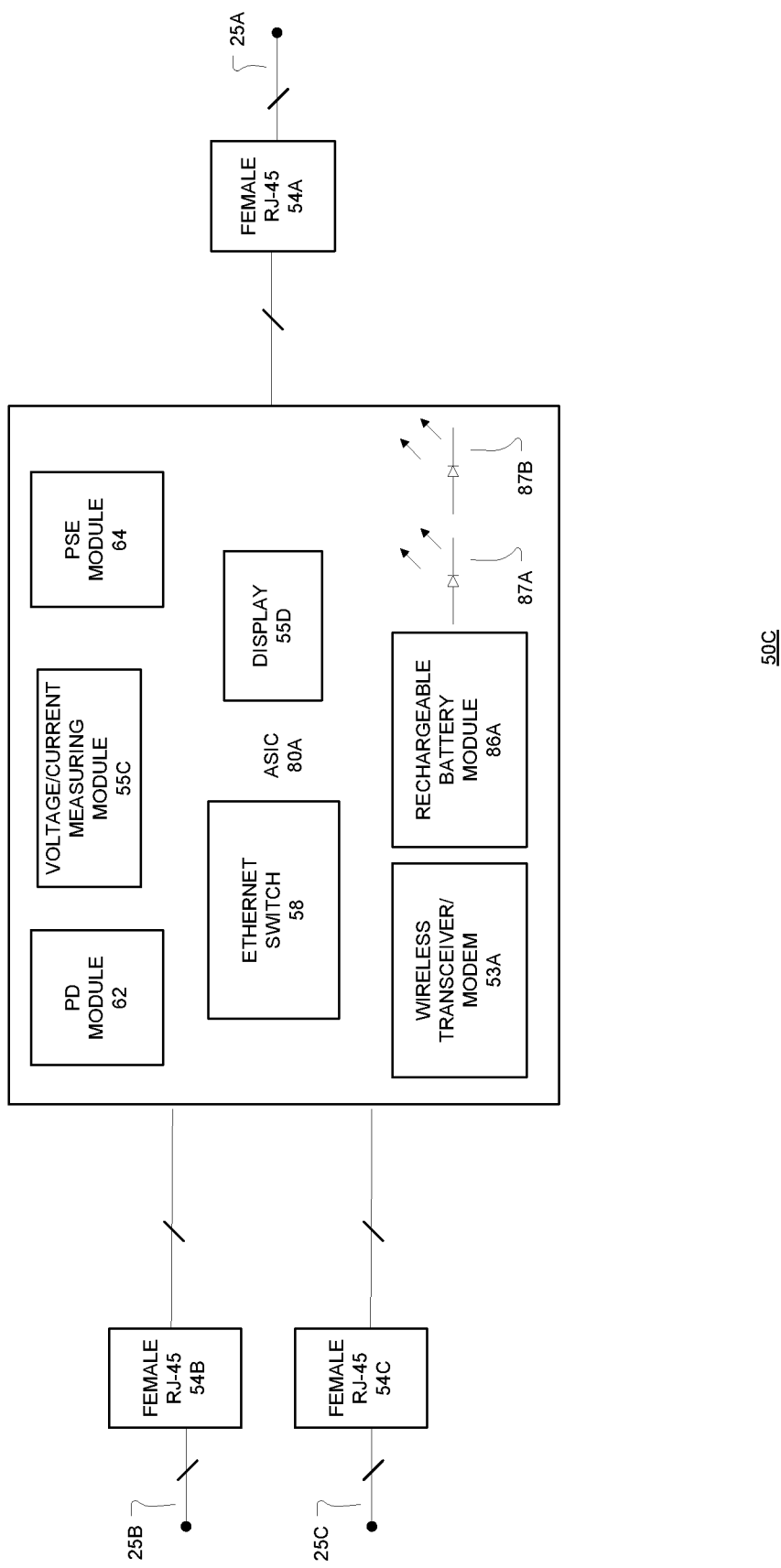
FIG. 4A is a block diagram of a POE testing and configuration device (POE-TCD) including an ASIC according to various embodiments.
Figure 4B:
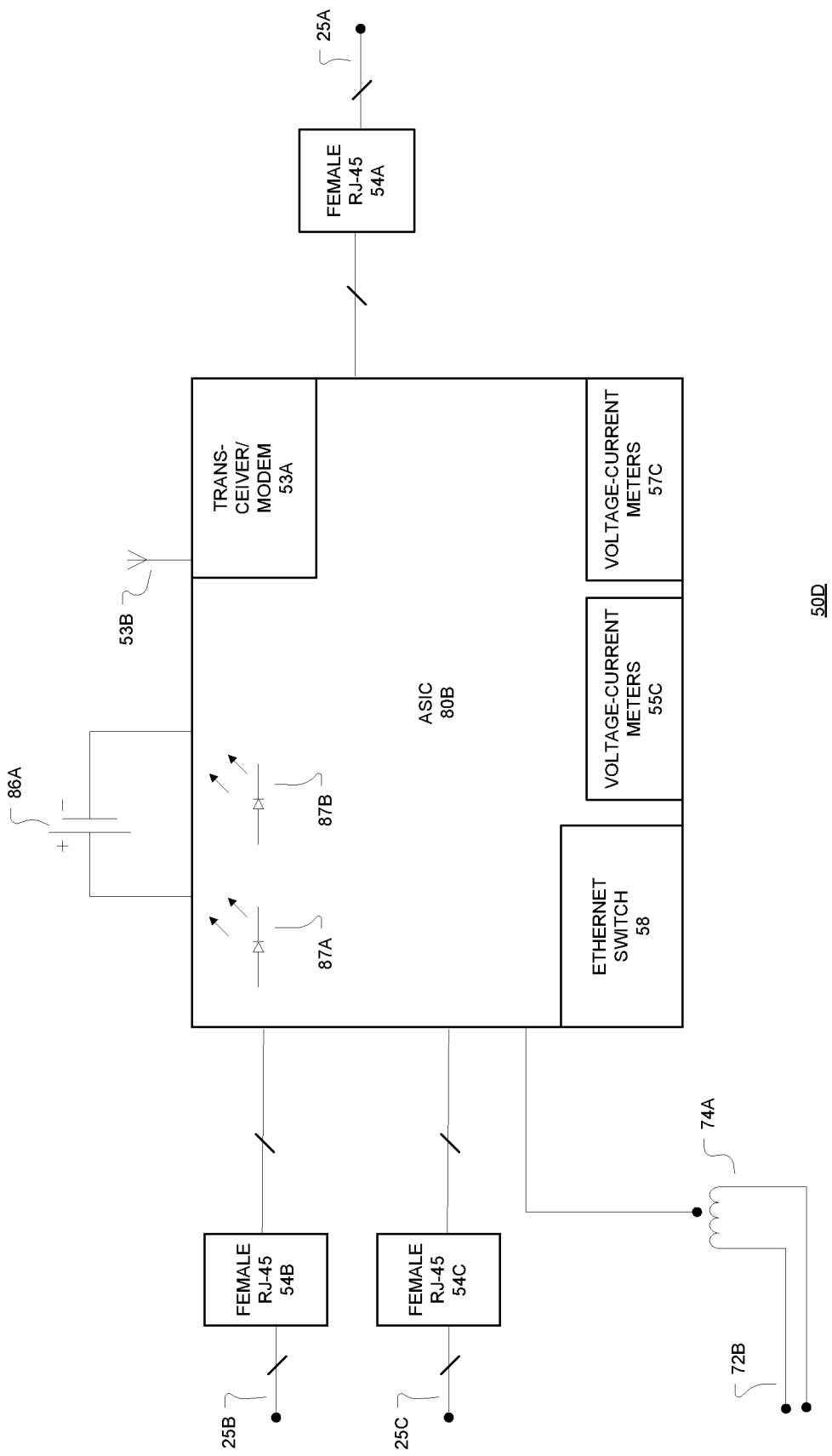
FIG. 4B is a block diagram of a POE testing and configuration device (POE-TCD) including an ASIC according to various embodiments.

FIGS. 4A and 4B are block diagrams of POE-TCD 50C-D according to various embodiments. As shown in FIGS. 4A and 4B, POE-TCD 50A is similar to POE-TCD 50C and POE-TCD 50B is similar to POE-TCD 50D where transceiver-modem 53A, ethernet switch 58, and energy processing—measuring modules 55C, 57C, PD module 62, PSE module 64 and other devices may be embedded in an application specific integrated circuit (ASIC) 80A-B. The RJ45 jacks 54A-C may be coupled to an ASIC 80A-B. The POE-TCD 50D may further include a battery 86A to provide operating power when power from wires 72B is not present (backup power) or primary power from a POE source in another embodiment. One or more light emitting diodes (LED) 87A, 87B may display the power levels or status of data on ports 54A-C.

In an embodiment, the transceiver/modem 53A may employ a code division multiple access (CDMA), time division multiple access (TDMA), Global System for Mobile Communications (GSM), Worldwide Interoperability for Microwave Access (WiMAX) or COMSAT protocol and communicate with the electronic devices 32A-D and 34A-B using a local protocol including Wi-Fi and Bluetooth. As known to one skilled on the art the Bluetooth protocol includes several versions including v1.0, v1.0B, v1.1, v1.2, v2.0+EDR, v2.1+EDR, v3.0+HS, and v4.0. The Bluetooth protocol is an efficient packet-based protocol that may employ frequency-hopping spread spectrum radio communication signals with up to 79 bands, each band 1 MHz in width, the respective 79 bands operating in the frequency range 2402-2480 MHz. Non-EDR (extended data rate) Bluetooth protocols may employ a Gaussian frequency-shift keying (GFSK) modulation. EDR Bluetooth may employ a differential quadrature phase-shift keying (DQPSK) modulation.

The Wi-Fi protocol may conform to an Institute of Electrical and Electronics Engineers (IEEE) 802.11 protocol. The IEEE 802.11 protocols may employ a single-carrier direct-sequence spread spectrum radio technology and a multi-carrier orthogonal frequency-division multiplexing (OFDM) protocol. In an embodiment, one or more electronic devices 32A-C, 34A-B, 36A, and 38A-B may communicate with a transceiver/modem 43A, 53A via a Wi-Fi protocol.

The cellular formats CDMA, TDMA, GSM, CDPD, and WiMAX are well known to one skilled in the art. It is noted that the WiMAX protocol may be used for local communication between the one or more electronic devices 30A to 30D may communicate with a transceiver/modem 53A. The WiMAX protocol is part of an evolving family of standards being developed by the Institute of Electrical and Electronic Engineers (IEEE) to define parameters of a point-to-multipoint wireless, packet-switched communications systems. In particular, the 802.16 family of standards (e.g., the IEEE std. 802.16-2004 (published Sep. 18, 2004)) may provide for fixed, portable, and/or mobile broadband wireless access networks. Additional information regarding the IEEE 802.16 standard may be found in IEEE Standard for Local and Metropolitan Area Networks—Part 16: Air Interface for Fixed Broadband Wireless Access Systems (published Oct. 1, 2004). See also IEEE 802.16E-2005, IEEE Standard for Local and Metropolitan Area Networks—Part 16: Air Interface for Fixed and Mobile Broadband Wireless Access Systems—Amendment for Physical and Medium Access Control Layers for Combined Fixed and Mobile Operation in Licensed Bands (published Feb. 28, 2006). Further, the Worldwide Interoperability for Microwave Access (WiMAX) Forum facilitates the deployment of broadband wireless networks based on the IEEE 802.16 standards. For convenience, the terms "802.16" and "WiMAX" may be used interchangeably throughout this disclosure to refer to the IEEE 802.16 suite of air interface standards.

Any of the components previously described can be implemented in a number of ways, including embodiments in software. Any of the components previously described can be implemented in a number of ways, including embodiments in software. The modules may include hardware circuitry, single or multi-processor circuits, memory circuits, software program modules and objects, firmware, and combinations thereof, as desired by the architect of the architecture 10 and as appropriate for particular implementations of various embodiments. The apparatus and systems of various embodiments may be useful in applications. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion. A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

Figure 6:
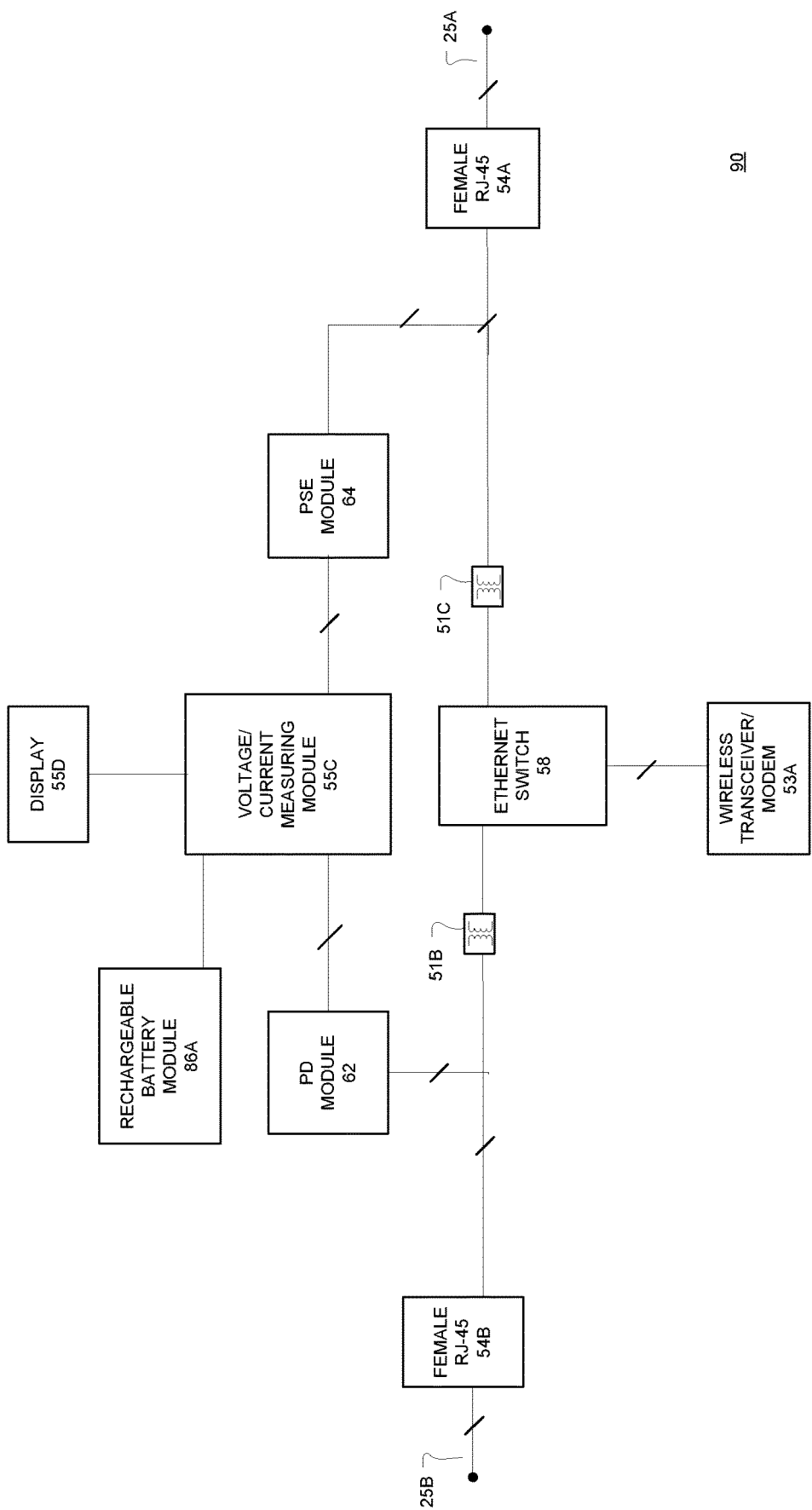
FIG. 6 is a block diagram of another POE testing and configuration device (POE-TCD) according to various embodiments.

The accompanying drawings that form a part hereof show, by way of illustration and not of limitation, specific embodiments in which the subject matter may be practiced. For example, as noted, a POE-TCD may include not include a second downstream port MC as shown in FIGS. 2B and 6 for a POE-TCD 90. The POE-TCD 90 shown in FIG. 6 is similar to POE-TCD 50A shown in FIG. 3A but does not include a second port MC. The POE-TCD 90 communicates with monitoring devices 38A-B wirelessly only. As also noted, the POE-TCD 50A-D and 90 may include an internal power source. In an embodiment, a POE-TCD 50A-D, 90 may not include an upstream port MA or the upstream port MA may not be coupled to a POE power source (FIG. 1D). In such an embodiment, the POE-TCD 50A-D, 90 may employ its internal power source to provide power to a PD 32C to be installed or configured.

The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus, the following claims are hereby incorporated into the Detailed Description, with each claim standing on its own as a separate embodiment.

What is claimed is:

1. A Power over Ethernet (PoE) apparatus for configuring and verifying the operation of a physically separate PoE powered device that provides data on a data pair, including:
a portable monolithic body including:
an upstream Ethernet port including a data wire pair and a power wire pair, the upstream Ethernet port for receiving PoE power from a physically separate PoE source via the data wire pair and the power wire pair, the PoE apparatus only receiving external power from the PoE source;
a downstream Ethernet port including a data wire pair and a power wire pair;
a PoE source module coupled to the data wire pair and the power wire pair of the upstream Ethernet port to provide power only to the data wire pair, the PoE apparatus, and the power wire pair of the downstream Ethernet port;
a plurality of signal transformers coupled the data wire pair of the downstream Ethernet port and further coupled to one of a data wire pair of a second Ethernet port to provide only the data received on the data wire pair of the downstream Ethernet port to the second Ethernet port and a wireless transmitter to wirelessly transmit a signal representing the data only received on the data wire pair of the downstream Ethernet port and;
a meter coupled to a plurality of diode bridges, the meter determining a characteristic of the PoE power signal; and
a user perceptible display, the display showing the determined signal characteristic.

2. The PoE apparatus for configuring and verifying the operation of a physically separate PoE powered device of claim 1, wherein the portable monolithic body includes only a single upstream Ethernet port and a single downstream Ethernet port.

3. The PoE apparatus for configuring and verifying the operation of a physically separate PoE powered device of claim 2, further comprising a voltage threshold module, the voltage threshold module coupled between the PoE source module and the downstream Ethernet port power wire pair, the voltage threshold module preventing the passage of PoE power signal to the downstream Ethernet port power wire pair until the voltage PoE power signal voltage reaches a predetermined voltage level.

4. The PoE apparatus for configuring and verifying the operation of a physically separate PoE powered device of claim 1, wherein the PoE source module includes a diode bridge coupled to one of the data wire pair and the power wire pair of the upstream Ethernet port to provide power only to the data wire pair and the power wire pair of the downstream Ethernet port.

5. The PoE apparatus for configuring and verifying the operation of a physically separate PoE powered device of claim 1, wherein the portable monolithic body includes a wireless transmitter coupled to the plurality of signal transformers for wirelessly transmitting a signal representing the data only received on the data wire pair of the downstream Ethernet port.

6. The PoE apparatus for configuring and verifying the operation of a physically separate PoE powered device of claim 5, wherein the downstream port includes two data wire pairs and two power wire pairs.

7. The PoE apparatus for configuring and verifying the operation of a physically separate PoE powered device of claim 6, wherein the portable monolithic body further includes a second Ethernet port that includes a data wire pair coupled to the plurality of signal transformers to provide only the data received on the data wire pair of the downstream Ethernet port to the data wire pair of the second Ethernet port.

8. The PoE apparatus for configuring and verifying the operation of a physically separate PoE powered device of claim 5, wherein the wireless transmitter is further coupled to the meter and wirelessly transmits a signal further representing the determined characteristic of the PoE power signal.

9. The PoE apparatus for configuring and verifying the operation of a physically separate PoE powered device of claim 8, wherein the wireless transmitter wirelessly transmits a signal further representing the PoE power signal's voltage level and power level.

10. The PoE apparatus for configuring and verifying the operation of a physically separate PoE powered device of claim 4, wherein the display alternatively shows the PoE power signal's voltage level and power level.

11. A method of configuring and verifying the operation of a physically separate Power over Ethernet (PoE) powered device via a PoE apparatus, the PoE apparatus including:
a portable monolithic body including:
an upstream Ethernet port including a data wire pair and a power wire pair, the upstream Ethernet port for receiving PoE power from a physically separate PoE source via the data wire pair and the power wire pair, the PoE apparatus only receiving external power from the PoE source;
a downstream Ethernet port including a data wire pair and a power wire pair;
a PoE source module coupled to the data wire pair and the power wire pair of the upstream Ethernet port to provide power only to the data wire pair, the PoE apparatus, and the power wire pair of the downstream Ethernet port;
a plurality of signal transformers coupled the data wire pair of the downstream Ethernet port and further coupled to one of a data wire pair of a second Ethernet port to provide only the data received on the data wire pair of the downstream Ethernet port to the second Ethernet port and a wireless transmitter to wirelessly transmit a signal representing the data only received on the data wire pair of the downstream Ethernet port; and a meter coupled to a plurality of diode bridges, the meter determining a characteristic of the PoE power signal; and a user perceptible display, the display showing the determined signal characteristic;

coupling the PoE apparatus upstream Ethernet port to a physically separate PoE power source;

coupling the PoE apparatus downstream Ethernet port to the physically separate PoE powered device whose operation is to be configured or verified; and employing a physically separate Ethernet device to view data provided by the physically separate PoE powered device on the downstream Ethernet port via one of the second Ethernet port and the wirelessly transmitted signal.

12. The method of configuring and verifying the operation of a physically separate PoE powered device of claim 11, wherein the PoE apparatus portable monolithic body only includes a single upstream Ethernet port and a single downstream Ethernet port.

13. The method of configuring and verifying the operation of a physically separate PoE powered device of claim 12, the PoE apparatus portable monolithic body further including a voltage threshold module coupled between the PoE source module and the downstream Ethernet port power wire pair, the voltage threshold module preventing the passage of a PoE power signal to the downstream Ethernet port power wire pair until the PoE power signal voltage reaches a predetermined voltage level.

14. The method of configuring and verifying the operation of a physically separate PoE powered device of claim 13, wherein the PoE source module includes a diode bridge coupled to one of the data wire pair and the power wire pair of the upstream Ethernet port to provide power only to the data wire pair and the power wire pair of the downstream Ethernet port.

15. The method of configuring and verifying the operation of a physically separate PoE powered device of claim 11, wherein the PoE apparatus portable monolithic body further includes a wireless transmitter coupled to the plurality of signal transformers and the method further includes employing a physically separate wirelessly capable Ethernet device to wirelessly receive the wireless signal transmitted by the wireless transmitter.

16. The method of configuring and verifying the operation of a physically separate PoE powered device of claim 15, wherein the downstream Ethernet port includes two data wire pairs and two power wire pairs.

17. The method of configuring and verifying the operation of a physically separate PoE powered device of claim 16, wherein the PoE apparatus portable monolithic body further includes a second Ethernet port that includes a data wire pair coupled to the plurality of signal transformers to provide only the data received on the data wire pair of the downstream Ethernet port to the data wire pair of the second Ethernet port.

18. The method of configuring and verifying the operation of a physically separate PoE powered device of claim 15, wherein the wireless transmitter is further coupled to the meter and further including wirelessly transmitting a signal further representing the determined characteristic of the PoE power signal.

19. The method of configuring and verifying the operation of a physically separate PoE powered device of claim 18, further including wirelessing transmitting a signal further representing the PoE power signal's voltage level and power level.

20. The method of configuring and verifying the operation of a physically separate PoE powered device of claim 14, further including alternatively displays the PoE power signal's voltage level and power level on the PoE apparatus display.

* * * * *